United States Patent
Brewer et al.

(10) Patent No.: US 8,655,370 B2
(45) Date of Patent: Feb. 18, 2014

(54) GEOGRAPHICAL LOCATION INFORMATION SHARING AMONG WIRELESS DEVICES

(75) Inventors: Beth Ann Brewer, La Mesa, CA (US); Jason B. Kenagy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1601 days.

(21) Appl. No.: 10/877,175

(22) Filed: Jun. 25, 2004

(65) Prior Publication Data
US 2005/0288036 A1 Dec. 29, 2005

(51) Int. Cl.
*H04W 24/00* (2009.01)

(52) U.S. Cl.
USPC ........... 455/456.1; 455/414.2; 455/456.2; 455/456.5; 455/456.6

(58) Field of Classification Search
USPC ......... 455/456.1–457, 414.1, 414.2, 412.2, 455/421, 433, 456.5, 456.6, 459; 701/207, 701/213–214, 216; 340/988; 342/357.01, 342/0.06, 0.12, 450, 457
See application file for complete search history.

(56) References Cited

U.S. PATENT DOCUMENTS

| | | | | |
|---|---|---|---|---|
| 5,661,652 A | * | 8/1997 | Sprague et al. | 455/456.2 |
| 6,032,051 A | * | 2/2000 | Hall et al. | 455/518 |
| 6,377,810 B1 | * | 4/2002 | Geiger et al. | 455/456.2 |
| 6,677,894 B2 | * | 1/2004 | Sheynblat et al. | 342/357.1 |
| 6,879,836 B2 | * | 4/2005 | Nakamoto et al. | 455/456.2 |
| 6,922,561 B2 | | 7/2005 | Chen et al. | |
| 6,922,566 B2 | * | 7/2005 | Puranik et al. | 455/456.2 |
| 7,272,647 B2 | | 9/2007 | Haraguchi et al. | |
| 2002/0026289 A1 | | 2/2002 | Kuzunuki et al. | |
| 2002/0169539 A1 | * | 11/2002 | Menard et al. | 701/200 |
| 2003/0054361 A1 | * | 3/2003 | Heller | 435/6 |
| 2003/0157945 A1 | | 8/2003 | Chen et al. | |
| 2004/0058698 A1 | | 3/2004 | Crockett et al. | |
| 2005/0227705 A1 | * | 10/2005 | Rousu et al. | 455/456.1 |

FOREIGN PATENT DOCUMENTS

GB 2363289 12/2001

(Continued)

OTHER PUBLICATIONS

International Preliminary Report on Patentability—PCT/US05/22362, The International Bureau of WIPO—Geneva, Switzerland, Jun. 13, 2011.

(Continued)

*Primary Examiner* — Christopher Grey
(74) *Attorney, Agent, or Firm* — Robert J. O'Connell; Ralph Freiwirth

(57) ABSTRACT

A system and method for sharing geographical location information among a set of wireless telecommunication devices, such as mobile telephones. A first wireless telecommunication device generates geographical location information of that wireless telecommunication device, either through a resident device such as a GPS device, or has another computer device on the network provide the geographic location information, and then shares the geographical location information through sending the location information to one or more servers for relay to a predesignated target set of wireless telecommunication devices. The server stores the identity of member devices of the target set and controls communication between the first wireless telecommunications device and the member devices of the target set. A second server can be used to modify the geographical information, such as providing a map showing the location of the first wireless telecommunication device and other member devices of the target set.

31 Claims, 5 Drawing Sheets

(56) References Cited

FOREIGN PATENT DOCUMENTS

| | | |
|---|---|---|
| JP | 9282384 | 10/1997 |
| JP | 11272698 | 10/1999 |
| JP | 2001218250 | 8/2001 |
| JP | 200215215 | 1/2002 |
| JP | 2002259098 | 9/2002 |
| JP | 2002277256 | 9/2002 |
| JP | 2003264859 | 9/2003 |
| WO | WO 0022860 | 4/2000 |
| WO | WO 0184867 | 11/2001 |

OTHER PUBLICATIONS

Takaaki Yoshii, Progress of an intellectual industry society:—Information managament, Japan Science and Technology Corporation Nov. 1, 2002, vol. 45, No. 8, pp. 575 to 577 (p. 576, left column, lines 11 to 14).

Takamichi Saito, A Privacy-Enhanced Access Control, The Transactions of the Institute of Electronics, Information and Communication Engineers, Japan, The Institute of Electronics, Information and Communication Engineers, Nov. 1, 2001, vol. J84-D-I, No. 11, pp. 1553 to 1562.

* cited by examiner

GEOGRAPHICAL LOCATION INFORMATION SHARING AMONG WIRELESS DEVICES

BACKGROUND OF THE INVENTION

The present invention generally relates to communication between computer devices across wireless computer networks. More particularly, the invention relates to the sharing of geographical location information among a predesignated set of wireless telecommunication devices selectively communicating across a wireless network.

In wireless telecommunication devices, such as cellular phones, PDAs, mini-laptops, and advanced pagers, the devices typically communicate over long distances through bridging telephone calls through the existing telephone networks and passing data packets across the telephone network. These wireless devices often have either limited or significant data processing and computing capability, and can accordingly send and receive software programs across the wireless phone network.

There exists a wireless telecommunication service that provides a quick one-to-one or one-to-many communication that is generically referred to as "Push-To-Talk" (PTT) capability. The specific PTT group of recipient devices for the wireless device is set up by the carrier and the wireless devices do not typically allow the modification of the group, to include or drop individuals from the group, or to direct a communication to be received by any fewer members than the entire group.

A PTT communication connection is typically initiated by a single button-push that activates a half-duplex link between the speaker and the group and once the button is released, the device can receive incoming PTT transmissions. In some arrangements, the PTT speaker will have the "floor" where no other group member can speak while the speaker is speaking. Once the speaker releases the PTT button, any other individual member of the group can engage their PTT button and they will have the floor.

In a designated group of telecommunication devices, such as a PTT group, the members are often in constant ongoing communications, using the group talking function frequently to coordinate a specific activity. However, other than the voice communications between the members of the group, there is not typically a method to communicate data or other information to the group members using the PTT or other wireless device functionality. There accordingly is a need for a system to provide information to group members regarding other group members, especially the geographical location of the other members of the group.

Accordingly, it would be advantageous to provide a system and method for a wireless device member of a group to provide their geographical location to other members of the group. Such system and method should give the user of the wireless telecommunication device the ability to selectively provide to other wireless devices the geographical location information to maintain the user's location privacy. Further, such system and method should be able to display the position of one to all members of the group to each member of group. It is thus to the provision of such a system and method of sharing geographical location information between wireless telecommunication devices that the present invention is primarily directed.

SUMMARY OF THE INVENTION

The present invention is a system and method for sharing geographical location information among a set of wireless telecommunication devices, such as mobile telephones, PDAs, pagers, tablet PCs, and other wireless telecommunication computer devices. A group member wireless telecommunication device generates its geographical location information either through a resident device such as a GPS device, or has another computer device on the network provide the geographic location information either to that device or to another device on the wireless network, and then the first wireless telecommunication device shares the geographical location information through sending the location information to one or more servers for relay to a predesignated target set of wireless telecommunication devices, i.e. other member devices of the group such as a predesignated PTT group. The one or more servers stores the identity of the member devices of the target set and controls communication between the first wireless telecommunications device and the group member devices. A second server can be used to modify the geographical information sent from the first wireless telecommunication device, such as providing a map showing the location of the first wireless telecommunication device and other member devices of the target set. The one or more servers can send actual geographical location information to each member of the group, or can provide a link or other reference to a location one the network where the location information may be located.

In one embodiment, the system for sharing geographical information of one or more wireless telecommunication devices with other wireless telecommunication devices across a wireless network includes a first wireless telecommunication device that selectively communicates with other wireless telecommunication devices across a wireless network, and the first wireless telecommunication device selectively generates information about the geographical location of that wireless telecommunication device. There is also a set of one or more target wireless communication devices that are designated by the first wireless communication device, such as designating other group members, and at least one server is in selective communication with the wireless telecommunication devices across the wireless network, and the server stores the identity of the set designated by the first wireless telecommunication device and controls communication between the first wireless telecommunications device and the designated set of member device for the first wireless telecommunications device. The first wireless telecommunication device selectively sends geographical location information to the at least one server for sharing the geographical information with the set of target wireless telecommunication devices designated by the first wireless telecommunication device.

In one embodiment, the method for sharing geographical location information of one or more wireless telecommunication devices with other wireless telecommunication devices across a wireless network includes the steps of designating a set of one or more target wireless telecommunication devices by a first wireless telecommunication device, the first wireless telecommunication device selectively communicating with other wireless telecommunication devices across a wireless network, then storing the identity of the set of wireless telecommunication devices designated by the first wireless telecommunication device at one or more servers where the one or more servers control communication between the first wireless telecommunications device and the member devices of the designated set for the first wireless telecommunications device. Then the method includes the steps of selectively generating information about the geographical location of a first wireless telecommunication device, selectively sending geographical location information from the first wireless telecommunication device to the one or more servers, and then sharing the geographical location information at the one or more servers with the set of target wireless telecommunication devices designated by the first wireless telecommunication device.

It is therefore an object of the system and method to allow a wireless telecommunication device to selectively provide geographical location information to the wireless telecommunication devices of other members of a predesignated group. The system and method allows the user of the wireless telecommunication device to selectively provide to other wireless devices his or her geographical location information, while otherwise maintaining the user's location privacy, if desired. Further, the system and method can display the geographical position of one device to one or all members of the group, or can provide enhanced features such as providing the geographical location of each member of group, or a map that displays the location(s) of one to all members of the group.

Other objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
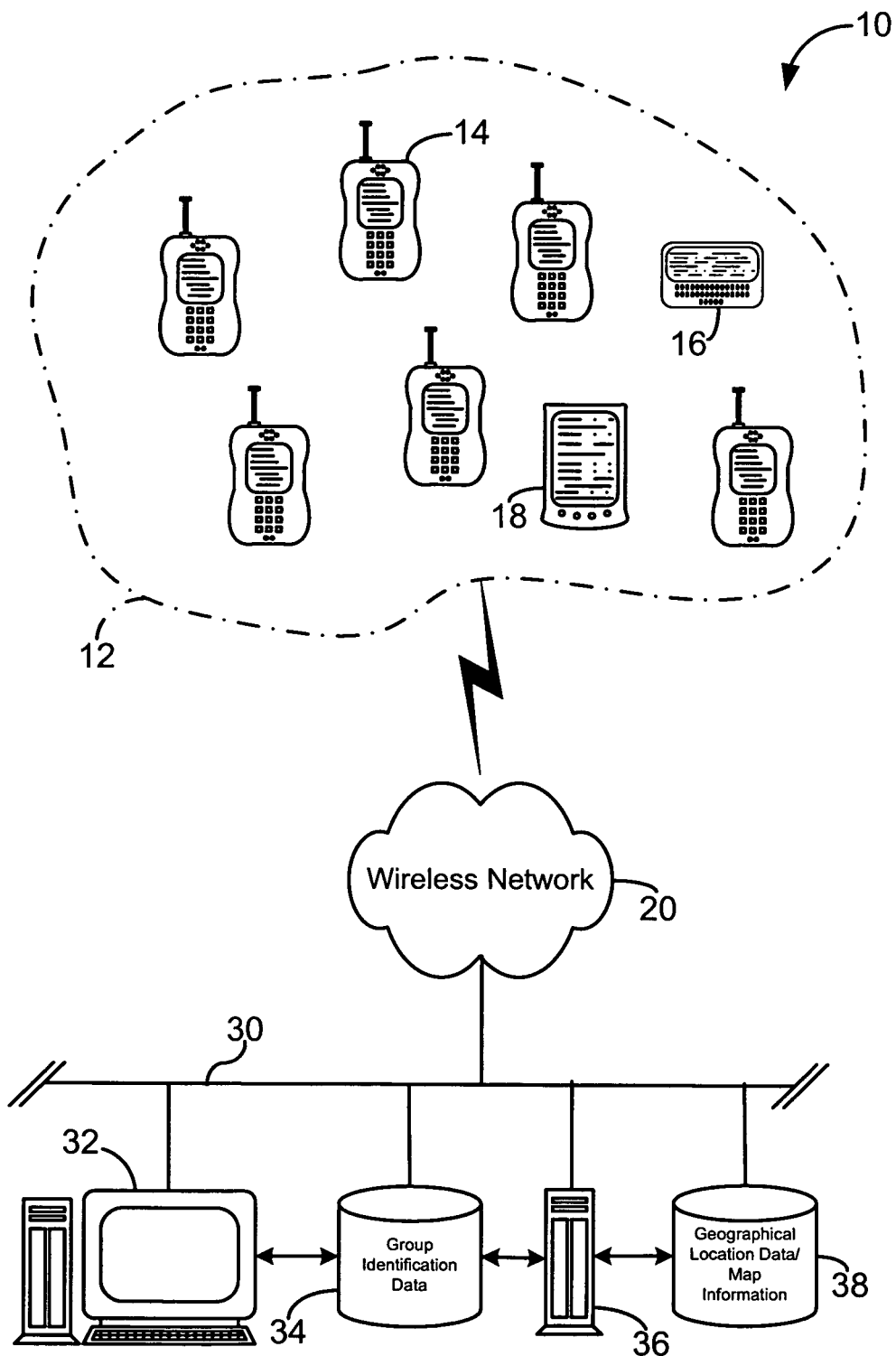
FIG. 1 is a representative diagram of a wireless network with a designated group of wireless telecommunication devices communicating with a group communication server and other computer devices across the wireless network.

With reference to the figures in which like numerals represent like elements throughout, FIG. 1 illustrates the system 10 for sharing the geographical location information of one or more wireless telecommunication devices, such as the wireless telephone 14, smart pager 16 and personal digital assistant (PDA) 18, with other wireless telecommunication devices across a wireless network 20. In the system 10, a first wireless telecommunication device, such as telephone 14, selectively generates information about the geographical location of that wireless telecommunication device and shares this information with a group or set 12 of one or more target wireless communication devices that are predesignated by the first wireless communication device, such as a direct-connect group in a push-to-talk environment. At least group communication server 32 is in selective communication with the one or more wireless telecommunication devices, such as the set 12, across the wireless network 20, the server preferably stores at least the identity of the set designated by the first wireless telecommunication device and the server 32 controls communication between the first wireless telecommunications device and the designated set 12.

The set 12 can also be increased, decreased, or created "ad hoc" by the wireless device 14,16,18 and the group communication server 32 can set up the designated set 12 for the communication, and potentially store the identity of the member devices of the set 12 for later recall by the wireless device 14,16,18. In such embodiment, the group communication server 32 stores the identity of the ad hoc set 12 designated by the wireless device 14,16,18 only to the extent that group communications can be bridged while group communication is occurring.

The first wireless telecommunication device (such as cellular telephone 14) selectively sends geographical location information to at least the group communication server 32, which is present on a server-side LAN 30 across the wireless network. The group communication server 32 will share the geographical information with the set 12 of target wireless telecommunication devices designated by the first wireless telecommunication device. In other embodiments, further described herein, other computer devices can be resident on the server-side LAN 30 or be accessible across the wireless network 20 to the wireless devices. The group communication server 32 can have an attached or accessible database 34 to store the group identification data for the wireless devices the server 32 control group communications for. There can also be a mapping server 36 or other server that receives and/or modifies geographical location data and then provides that modified data ultimately to the wireless devices of the set, such as a map (FIG. 4) showing the location of all wireless devices of the set 12. The mapping server 36 is shown here as having accessible a geographical location and map database 38 that can provide the maps for overlay of the device locations. It should be appreciated that the number of computer components resident on server-side LAN 30, or across the wireless network 20, or Internet generally, are not limited.

Figure 2:
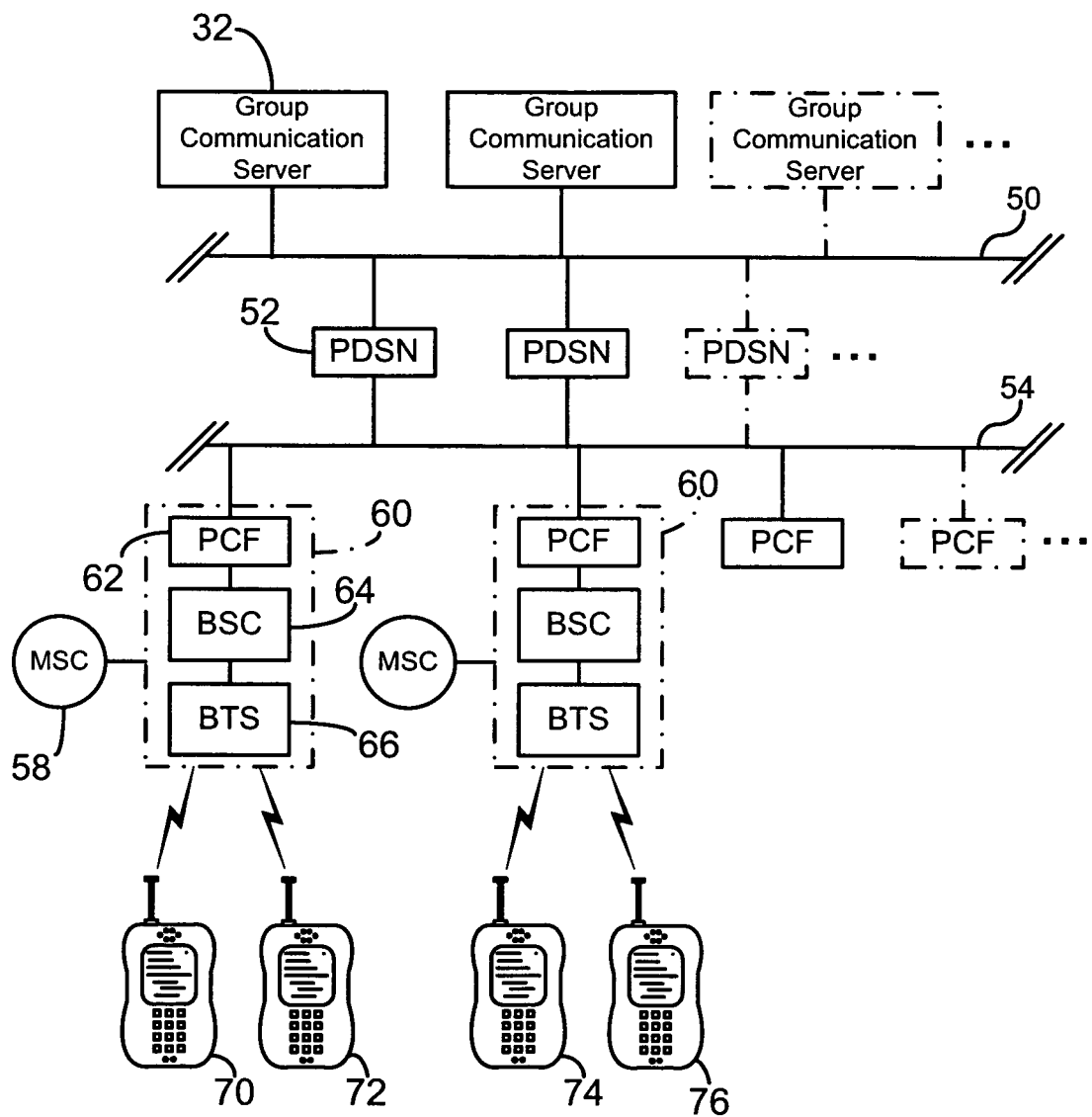
FIG. 2 is a representative diagram of one embodiment of a wireless network in a common cellular telecommunication configuration, having a group communication server control communications between the wireless telecommunication devices of group members.

FIG. 2 is a representative diagram of one embodiment of a wireless network in a common cellular telecommunication configuration, having a group communication server 32 control communications between the wireless devices of set group members (devices 70,72,74,76) in a PT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art.

Cellular telephones and telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and stock monitors, or simply data such as news and sports-related data. In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side 30 component that is aware of and/or can retrieve the identity of the members of the set 12, or direct the identity of the members of the set 12 to another computer device, such as mapping server 36.

Figure 3:
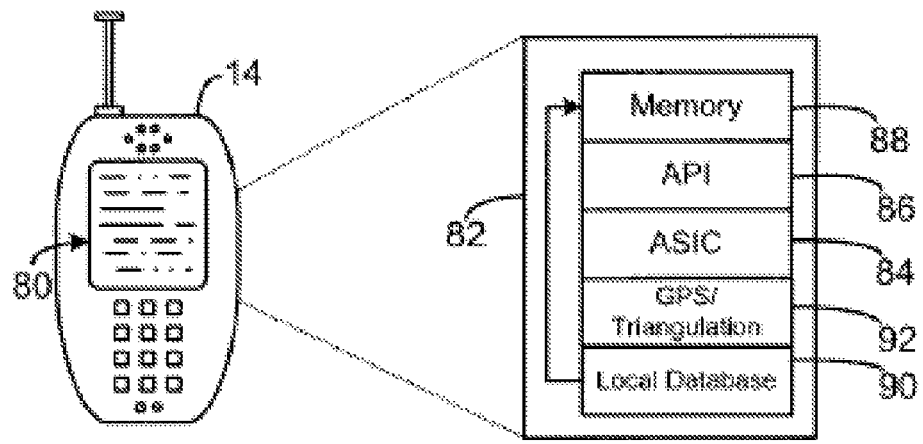
FIG. 3 is a block diagram illustrating the computer platform of the wireless telecommunication device with a resident GPS device.

FIG. 3 is a block diagram illustrating the computer platform 82 of the wireless device (cellular telephone 14) with a resident geographical location data device 92. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device 14, the computer platform 82 also includes a geographic location data device 92. Examples of such devices are global positioning system (GPS) devices that utilize the signals from a worldwide navigation system formed from a group of 24 satellites and ground stations. The GPS device can comprise only a few integrated circuits that calculate the actual map coordinates of the wireless device 14 and can relay this data to the group communication server 32. In an alternate embodiment, the device 92 can determine the relative coordinates of the wireless device 14 based upon triangulation of one or more base stations 60. In such embodiment, the geographical location data device 92 can provide relative geographical location information, such as a zip code, area of town, city, or general environs. Further, the geographical information can simply indicates the proximity of the first wireless telecommunication device 14 to one or more other member devices of the set 12. Thus, the wireless device 14 can share whatever geographical location data it generates.

The group communication server 32 can immediately send the geographical information of the first wireless telecommunication device 14 to the set 12 designated by the first wireless device, and not store any throughput geographical data. In an alternate embodiment, the group communication server 32 can also store the geographical information and selectively relay the stored geographical information to the set 12. In such an embodiment, it is preferable that the group communication server 32, or other device, include the time of storing with the stored geographical location information relayed to the set 12 designated by the first wireless device.

Further, while the wireless device can selectively generate its geographical location information in the embodiment of FIG. 3, the first wireless device can selectively generate the geographical location information from requesting data from another computer device on the wireless network 20 that can send geographical information of the wireless telecommunication device 14 thereto. For example, the wireless device 14 can prompt another device such as mapping server 36, if so embodied, to learn the geographical location of the wireless device 14, such as by performing a trace-route on the data packet arriving from the wireless device 14 and determining the base station 60 or other computer node where the wireless device 14 contacted the wireless network 20. The wireless device 14 then will relay the geographical location data received to the group communication server 32 for sharing with other members of the set 12. In another embodiment of the system 10, the wireless device 14 can generate the geographical location data from requesting data from another computer device on the wireless network 20, such as mapping server 36 or like other server, and the other server can send geographical information of the wireless device 14 to the group communication server 32 and/or one to all members of the set 12 provided that the other server has permission and is able to learn the identity of the members of the set 12.

In another embodiment, the wireless device 14 can selectively request the group communication server 32 to send a link to the geographical location information of the wireless device resident wherein the information is resident on the second server, such as mapping server 36. Each wireless device receiving the link can then request the geographical information of the first wireless telecommunication device 14 from the second server (such as mapping server 36).

Figure 4:
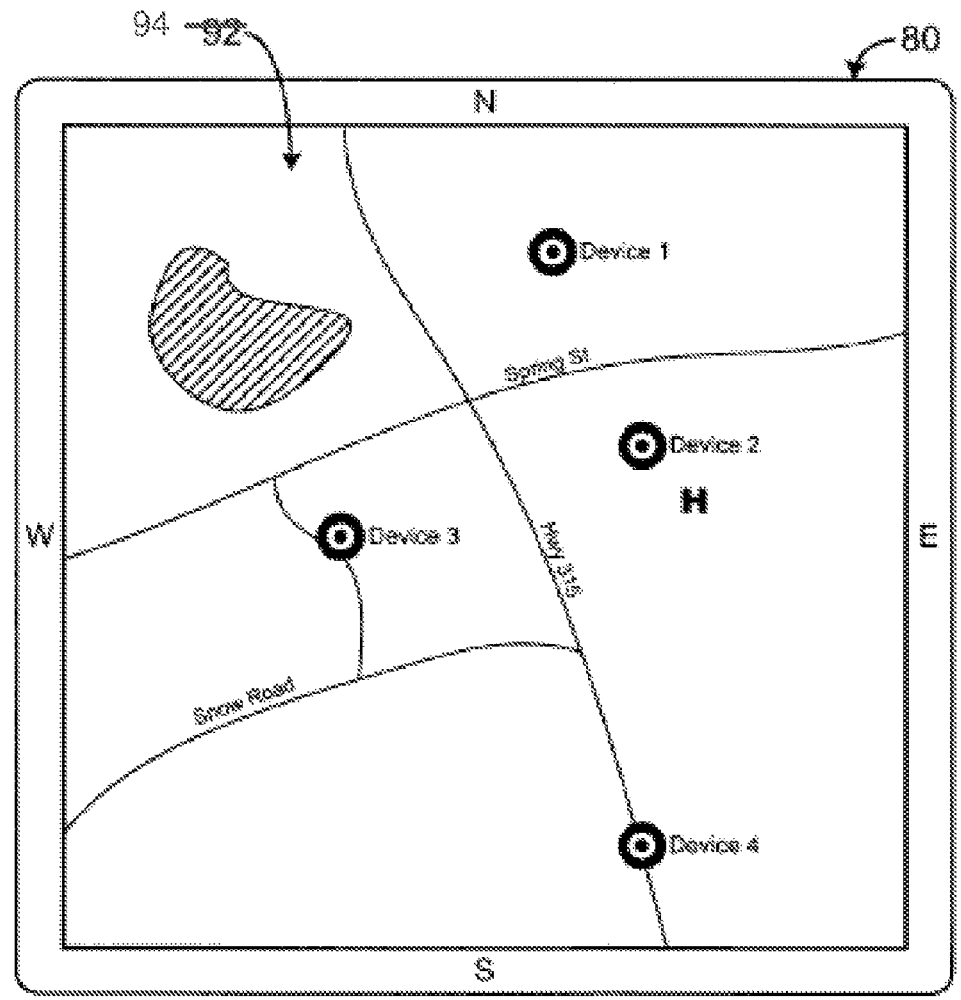
FIG. 4 is a map that is displayed on one or more of the wireless telecommunication devices of the group, and which shows the geographical location of four member wireless devices of the group.

As shown in FIG. 4, in one embodiment, the mapping server 36 can provide a map 94 for display by the member wireless devices of the set 12. In FIG. 4, the map 94 is shown on the display 80 of the wireless device 14 and shows the geographical location of four member wireless devices of the set 12. In this embodiment, each wireless device of the set 12 sent its geographical location information data to the mapping server 36 on the wireless network 20 and the mapping server 36 modified the geographical location information for each wireless device and represented the location on a map 94. Accordingly, the mapping server 36 then provided a hyperlink to the map 94 to the group communication server 32 and then the hyperlink was shared the member devices of the set 12. The map 94 generated by the mapping server 36 further can show the geographical location information of one to all wireless devices in the set 12. While a map 94 is shown as one manner of display of the geographical location information, such information can be displayed in many different types of formats, such as raw geographical coordinates (e.g., Latitude: N 330 53.205' (N 33.886754.degree.) Longitude: W 84.degree. 27.043' (W 84.450708.degree.), landmark information (e.g., next to the Smith Building), proximity (e.g., device 1 is closest to device 2), or any other format that assists the user of the wireless device 14.

Figure 5:
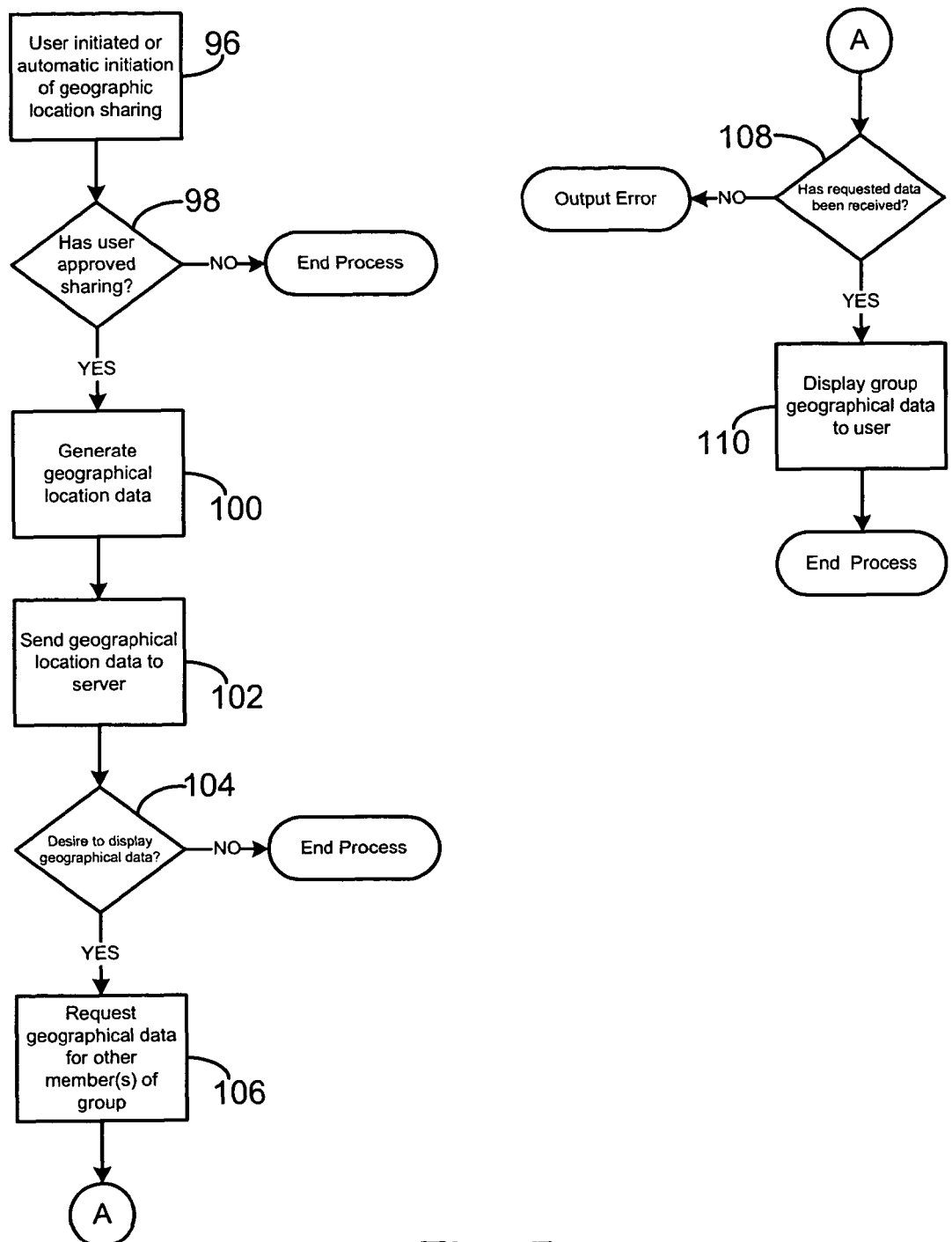
FIG. 5 is a flowchart of one embodiment of the process to share geographical location information to other wireless telecommunication devices in the group through providing the geographical location data to the group communication server.

FIG. 5 is a flowchart of one embodiment of the process to share geographical location information to other wireless devices in the set 12 through providing the geographical location data to the group communication server 32. The user initiates the sharing of his or her geographical location information, as shown at step 96. Step 96 can also be an automated sharing of information where either other member of the set 12 or the group communication server 32 itself prompts the wireless device 14 for its geographical location information. Then a determination is made as to whether the user has approved sharing the geographical location information as shown by decision 98. If the user has not given approval to share geographical location information at decision 98, then the sharing process ends.

Otherwise, of the user has approved sharing geographical location information at decision 98, then the geographical location data is generated as shown at step 100. Step 100 can occur from either a resident device of the wireless device 14, such as GPS device 92, or can occur from the retrieval or send of the geographical location data from a second server, such as mapping server 36, as shown above. After generation of the geographical location data at step 100, the data is sent to the group communication server 32 as shown at step 102. Then, in this embodiment, a determination is made as to whether the user of the device desires to display geographical data for other member devices of the set 12, as shown at decision 104. If the user does not desire to display the data at decision 104, the sharing process terminates.

Otherwise, if the user of the wireless device 14 desires to display the geographical location data at decision 104, then the wireless device 14 request the geographical location data for other member of the designated set 12 of the wireless device 14, as shown at step 106, and such request is made to the group communication server 36. A determination is then made as to whether the requested data has been received, as shown at decision 108. If the requested data is not received at decision 108, then an error is output and the process terminates. Otherwise, if the requested geographical location data has been received at decision 108, the received data is displayed to the user of the wireless device 14, as shown at step 110, and then process terminates. An example of the display in step 110 would be display of the map 94 of FIG. 4 on the graphics display 80 of the wireless device 14.

Figure 6:
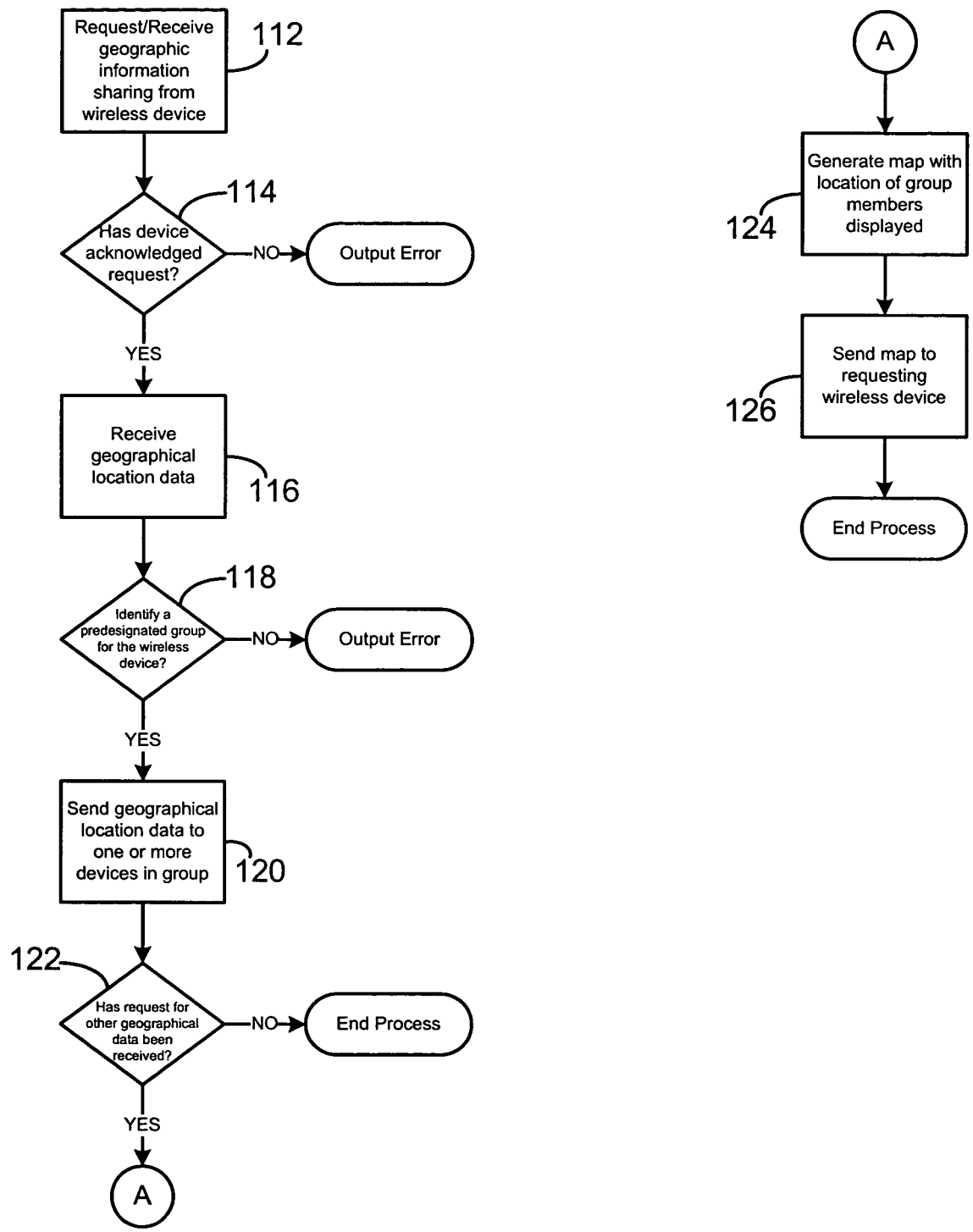
FIG. 6 is a flowchart of one embodiment of the process executing on the group communication server to share geographical location data sent from a first wireless telecommunication device with other member devices of the predesignated group/set of the first wireless telecommunication device.

FIG. 6 is a flowchart of one embodiment of the process executing on the group communication server 32 to share geographical location data sent from a first wireless device 14 with other wireless devices of the predesignated set 12 of the first wireless device 14. The group communication server 32 either requests, if automated, or receives the geographical location information from one of the wireless devices 14 of the set 12 for sharing with other member devices of the set 12, as shown at step 112. Then a determination is made as to whether the wireless device 14 sent the data to the group communication server 32 shown at decision 114. If the request for graphical location information has not been acknowledged at decision 114, an error is output and the process terminates.

Otherwise, if the group communication server 32 has its request acknowledged at decision 114, then the geographical location data is received from the wireless device, as shown at step 116. Then a determination is made as to whether a predesignated group/set 12 of wireless devices is identifiable for the wireless device 14 for which the geographical location information has been received, as shown at decision 118. If no group/set 12 can be located at decision 118, then an error is output and the process terminates. Otherwise, if a predesignated group/set 12 of wireless devices is identified for the wireless device 14, then the geographical location information is sent to one or more of the wireless devices in the set 12, as shown at step 120.

A determination is then made, in this embodiment, as to whether the geographical location information for other wireless devices in the set 12 has been made, as shown at decision 122. An example of such embodiment would be the wireless device 14 requesting a map 94 to show the location of all wireless devices in the set 12. If no geographical location information has been requested at decision 122, then the process terminates. Otherwise, if the request for other geographical location information has been made at decision 122, a map is generated with the location of the group member devices displayed thereon, as shown at step 124. As is described above, step 124 can be performed on the group communication server 32 or a mapping server 36. Further, step 124 can alternately be sending raw data or geographical location information in another form, as is described above. Then the map 94 is sent to the requesting wireless device 14, as shown at step 126, and the display process terminates. In alternate embodiments, the geographical location information is sent to the wireless device 12 in whatever format the system specifies.

It can thus be seen that the wireless device 14 and group communication server 32 therefore provide a method for sharing geographical location information of one or more wireless telecommunication devices with other wireless telecommunication devices across a wireless network including the steps of designating a set 12 of one or more target wireless communication devices by a first wireless communication device 14, where the first wireless telecommunication device 14 selectively communicates with other wireless telecommunication devices across a wireless network 20, and storing the identity of the set of wireless telecommunication devices designated by the first wireless telecommunication device 14 at the group communication server(s) 32, where the group communication server(s) 32 controls communication between the first wireless telecommunications device 14 and the designated set 12 of the first wireless telecommunications device 14. Then the method includes the steps of selectively generating information about the geographical location of a first wireless telecommunication device 14, selectively sending geographical location information from the first wireless telecommunication device 14 to the group communication server(s) 32, and then sharing the geographical location information at the group communication server(s) 32 with the set 12 of target wireless telecommunication devices designated by the first wireless telecommunication device 14. The step of sending the geographical location information can be immediately sending the geographical location information of the first wireless telecommunication device 14 to the set 12 designated by the first wireless device 14, or can include the steps of storing the geographical information of the first wireless telecommunication device 14 at the group communication server(s) 32, and then selectively relaying the stored geographical information from the group communication servers(s) 32 to the set 12 of wireless telecommunication devices designated by the first wireless device 14. In such embodiment, the method can further include the step of including the time of storing with the stored geographical location information relayed to the set designated by the first wireless device.

The step of selectively generating information about the geographical location of a first wireless telecommunication device 14 can be selectively generating information about the geographical location from a device resident on the first wireless telecommunication device 14 providing data for the geographical location of that device, such as the GPS device 92. The step can alternately be where the first telecommunication device 14 communicates with the wireless network 20 at a communication node (base station 60), and the step of selectively generating information about the geographical location can be generating geographical location information by the first wireless telecommunication device 14 triangulating a geographical location based upon the communication node of the wireless network 20 the first wireless device 14 is in communication with. Alternately, the step of selectively generating information about the geographical location of a first wireless telecommunication device 14 can be selectively generating information about the geographical location of that wireless telecommunication device 14 from requesting data from another computer device on the wireless network 20, such as mapping server 36, that can send geographical information for the first wireless telecommunication device 14 to the first telecommunication device 14. Alternately, the step of selectively generating information about the geographical location of a first wireless telecommunication device 14 can be selectively generating information about the geographical location of the first wireless telecommunication device 14 through requesting data from another computer device on the wireless network 20 that can send geographical location information of the first wireless telecommunication device 14 to the group communication server(s) 32 or other member devices of the set 12.

The method can include the step of sending geographical location information data to a data server, such as mapping server 36 on the wireless network 20, the data server selectively modifying the geographical location information for the first wireless telecommunication device 14. In such embodiment, the method can include the steps of selectively requesting the group communication server(s) 32 to send a link to the geographical information of the first wireless telecommunication device 14 resident on the data server to one or more devices of the set 12 of target wireless telecommunication devices designated by the first wireless telecommunication device 14 such that each wireless telecommunication device of the set 12 selectively requesting the geographical information of the first wireless telecommunication device from the data server at each wireless telecommunication device of the designated set 12 receiving the link.

In one embodiment, the link is a hyperlink to a map 94 generated by the data server (mapping server 36) showing the location of the first wireless telecommunication device 14. The method can further includes the step of generating a map 94 by the mapping server 36 server further showing the geographical location information of one to all wireless telecommunication devices in the set 12 designated by the first wireless telecommunications device 14, an example of such map 94 shown in FIG. 4. Further, the step of sharing the geographical location information can be sharing geographical location information also indicating the proximity of the first wireless telecommunication device 14 to one or more wireless telecommunication devices of the set 12 designated by the first wireless device.

The method accordingly can be implemented by the execution of a program held computer readable medium, such as the memory 88 of the computer platform 82. The instructions can reside in various types of signal-bearing or data storage primary, secondary, or tertiary media. The media may comprise, for example, RAM (not shown) accessible by, or residing within, the wireless device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for sharing geographical information for a first wireless telecommunication device with other wireless telecommunication devices across a wireless network, comprising:
   a plurality of target wireless telecommunication devices that are designated by the first wireless telecommunication device;
   the first wireless telecommunication device comprising:
      a user interface;
      a first wireless telecommunication device processor coupled to the user interface and configured with processor-executable instructions to perform operations comprising:
         selectively communicating with other wireless telecommunication devices across the wireless network;
         selectively generating information about the geographical location of said first wireless telecommunication device;
         selectively transmitting the generated geographical location information to a group communication server;
         receiving approval via the user interface to share the generated information about the geographical location of the first wireless telecommunication device;

receiving approval via the user interface to display information about the geographical location of at least one of the plurality of target wireless telecommunication devices;

requesting information about the geographical location of the at least one of the plurality of target wireless telecommunication devices when both approval to share the generated information about the geographical location of the first wireless telecommunication device and approval to display information about the geographical location of the at least one of the plurality of target wireless telecommunication devices have been received; and the group communication server in selective communication with one or more wireless telecommunication devices across the wireless network, comprising:

a group communication memory;

a server processor coupled to the group communication memory and configured with processor-executable instructions to perform operations comprising:

storing an identity of the plurality of target wireless telecommunication devices designated by the first wireless telecommunication device;

controlling communication between the first wireless telecommunication device and the plurality of the target wireless telecommunication devices;

transmitting the requested information about the geographical location of the at least one of the plurality of target wireless telecommunication devices to the first wireless telecommunication device; and transmitting the generated information about the geographical location of the first wireless telecommunication device to at least one of the plurality of target wireless telecommunication devices designated by the first wireless telecommunication device.

2. The system of claim 1, wherein transmitting the generated information about the geographical location of the first wireless telecommunication device to at least one of the plurality of target wireless telecommunication devices designated by the first wireless telecommunication device occurs immediately after the generated information about the geographical location of the first wireless telecommunication device is received.

3. The system of claim 1, wherein the group communication server processor is configured with processor-executable instructions to perform operations further comprising:

storing the geographical information of the first wireless telecommunication device; and selectively relaying the stored geographical information of the first wireless telecommunication device to at least one of the plurality of target wireless telecommunication devices designated by the first wireless telecommunication device.

4. The system of claim 3, wherein the server processor is configured with processor-executable instructions such that transmitting the requested information about the geographical location of the first wireless telecommunication device further comprises:

transmitting a time of storing the stored geographical location information of the first wireless telecommunication device to the plurality of target wireless telecommunication devices designated by the first wireless telecommunication device.

5. The system of claim 1, wherein the first wireless telecommunication device further comprises:

a resident device operable to provide data for the geographical location, wherein generating information about the geographical location of said first wireless telecommunication device is performed by the resident device.

6. The system of claim 1, wherein generating information about the geographical location of the first wireless telecommunication device comprises:

requesting data from another computer device on the wireless network configured to send geographical information of the first wireless telecommunication device to the first telecommunication device.

7. The system of claim 1, wherein first wireless telecommunication device processor is configured with processor-executable instructions to perform operations such that requesting information about the geographical location of the at least one of the plurality of target wireless telecommunication devices comprises:

requesting data from another computer device on the wireless network that can send geographical information of the at least one of the plurality of target wireless telecommunication devices to the group communication server.

8. The system of claim 1, wherein first wireless telecommunication device processor is configured with processor-executable instructions to perform operations such that selectively transmitting the generated geographical location information to the group communication server comprises:

requesting data from another computer device on the wireless network that can send geographical information of the first wireless telecommunication device to at least one of the plurality of target wireless telecommunication devices designated by the first wireless telecommunication device.

9. The system of claim 1, wherein first wireless telecommunication device processor is configured with processor-executable instructions to perform operations such that selectively transmitting the generated geographical location information to the group communication server comprises:

transmitting generated geographical information data to a second server on the wireless network, the second server is further operable to selectively modify the geographical location information for the first wireless telecommunication device.

10. The system of claim 9, wherein the first wireless telecommunication device processor is configured with processor-executable instructions to perform operations such that requesting information about the geographical location of the at least one of the plurality of target wireless telecommunication devices further comprises:

requesting the group communication server to send a link to the geographical information of the first wireless telecommunication device resident on the second server to the at least one of the plurality of target wireless telecommunication devices designated by the first wireless telecommunication device such that each of the at least one of the plurality of target wireless telecommunication devices operable to receive the link can request the geographical information of the first wireless telecommunication device from the second server.

11. The system of claim 10, wherein the link is a hyperlink to a map generated by the second server showing the location of the first wireless telecommunication device.

12. The system of claim 11, wherein the map generated by the second server is further operable to show the geographical location information of one to all wireless telecommunication devices in the plurality of target wireless telecommunication devices designated by the first wireless device.

13. The system of claim 5, wherein the resident device comprises a GPS device and the geographical information includes the map coordinates of the first wireless telecommunication device.

14. The system of claim 1, wherein the geographical information indicates a proximity of the first wireless telecommunication device to the at least one wireless telecommunication devices of the plurality of target wireless telecommunication devices designated by the first wireless telecommunication device.

15. The system of claim 5, wherein the first wireless telecommunication device communicates with the wireless network through a communication node, and the first wireless telecommunication device triangulates a geographical location based upon the communication node of the wireless network the first wireless telecommunication device is in communication with.

16. A method for sharing geographical location information for a first wireless telecommunication device with other wireless telecommunication devices across a wireless network, comprising:
   designating a plurality of target wireless telecommunication devices by the first wireless telecommunication device;
   selectively communicating, by the first wireless telecommunication device, with other wireless telecommunication devices across the wireless network;
   generating, by the first wireless telecommunication device, information about a geographical location of the first wireless telecommunication device;
   selectively transmitting, by the first wireless telecommunication device, the generated geographical location information to a group communication server;
   receiving approval, via a user interface of the first wireless telecommunication device, to share the information about the geographical location of the first wireless telecommunication device;
   receiving approval, via the user interface of the first wireless telecommunication device, to display information about a geographical location of at least one of the plurality of target wireless telecommunication devices;
   requesting information, by the first wireless telecommunication device, about the geographical location of the at least one of the plurality of target wireless telecommunication devices when both approval to share the generated information about the geographical location of the first wireless telecommunication device and approval to display information about the geographical location of the at least one of the plurality of target wireless telecommunication devices are received;
   storing, by the group communication server, an identity of the plurality of target wireless telecommunication devices designated by the first wireless telecommunication device;
   controlling, by the group communication server, communication between the first wireless telecommunication device and the plurality of target wireless telecommunication devices;
   transmitting, by the group communication server, the requested information about the geographical location of the at least one of the plurality of target wireless telecommunication devices to the first wireless telecommunication device; and
   transmitting, by the group communication server, the generated information about the geographical location of the first wireless telecommunication device to the at least one of the plurality of the target wireless telecommunication devices designated by the first wireless telecommunication device.

17. The method of claim 16, wherein transmitting the generated geographical location information of the first wireless telecommunication device to the at least one of the plurality of target wireless telecommunication devices designated by the first wireless telecommunication device occurs immediately after the generated information about the geographical location of the first wireless telecommunication device is received.

18. The method of claim 16, further comprising:
   storing the geographical information of the first wireless telecommunication device in the group communication server; and
   selectively relaying, by the group communication server, the stored geographical information of the first wireless telecommunication device to the at least one of the plurality of target wireless telecommunication devices designated by the first wireless telecommunication device.

19. The method of claim 18, further comprising transmitting a time of storing the stored geographical location information of the first wireless telecommunication device to the plurality of target wireless telecommunication devices designated by the first wireless telecommunication device.

20. The method of claim 16, wherein generating information about the geographical location of the first wireless telecommunication device further comprises:
   providing, by a device resident on the first wireless telecommunication device, data for the geographical location of the first wireless telecommunication device, wherein generating information about the geographical location of the first wireless telecommunication device is performed by the resident device.

21. The method of claim 16, wherein generating information about the geographical location of the first wireless telecommunication device comprises:
   requesting, by the first wireless telecommunication device, data from another computer device on the wireless network that can send geographical location information of the first wireless telecommunication device to the first wireless telecommunication device.

22. The method of claim 16, wherein requesting information about the geographical location of the at least one of the plurality of target wireless telecommunication devices comprises:
   requesting data from another computer device on the wireless network that can send geographical location information of the at least one of the plurality of target wireless telecommunication devices to the group communication server.

23. The method of claim 16, wherein selectively transmitting the generated information about the geographical location to the group communication server comprises:
   requesting data from another computer device on the wireless network that can send geographical information of the first wireless telecommunication device to the at least one of the plurality of target wireless telecommunication devices designated by the first wireless telecommunication device.

24. The method of claim 16, wherein selectively transmitting the generated geographical location information to the group communication server comprises:

transmitting generated geographical location information to a data server on the wireless network, the data server selectively modifying the geographical location information for the first wireless telecommunication device.

25. The method of claim 16, wherein requesting information about the geographical location of the at least one of the plurality of target wireless telecommunication devices further comprises:
requesting the group communication server to send a link to the geographical information of the first wireless telecommunication device resident on a data server to the at least one of the plurality of target wireless telecommunication devices designated by the first wireless telecommunication device such that each of the at least one of the plurality of target wireless telecommunication devices can request the geographical location information from the data server; and
requesting the geographical information of the first wireless telecommunication device from the data server by the at least one of the plurality of target wireless telecommunication devices receiving the link.

26. The method of claim 25, wherein the link is a hyperlink to a map generated by the data server showing the geographical location of the first wireless telecommunication device.

27. The method of claim 26, wherein the map generated by the data server further shows the geographical location information of one to all wireless telecommunication devices in the plurality of target wireless telecommunication devices designated by the first wireless telecommunication device.

28. The method of claim 20, wherein the first wireless telecommunication device includes a GPS device and wherein generating information about the geographical location of the first wireless telecommunication device comprises generating geographical location information including map coordinates of the first wireless telecommunication device.

29. The method of claim 16, wherein transmitting the generated geographical location information comprises transmitting generated geographical location information further indicating a proximity of the first wireless telecommunication device to the at least one of the plurality of target wireless telecommunication devices designated by the first wireless telecommunication device.

30. The method of claim 20, further comprising communicating, by the first telecommunication device, with the wireless network at a communication node,
wherein generating information about the geographical location comprises generating geographical location information by the first wireless telecommunication device triangulating a geographical location based upon the communication node of the wireless network the first wireless telecommunication device is in communication with.

31. A system for sharing geographical information between telecommunication devices on a wireless network, comprising:
a first wireless telecommunication device, comprising:
means for designating a plurality of target wireless telecommunication devices;
means for selectively communicating with other wireless telecommunication devices across the wireless network;
means for generating information about a geographical location of the first wireless telecommunication device;
means for selectively transmitting the generated geographical location information to at least one group communication server;
means for receiving approval to share the information about the geographical location of the first wireless telecommunication device;
means for receiving approval to display information about a geographical location of at least one of the plurality of target wireless telecommunication devices;
means for requesting information about the geographical location of at least one of the plurality of target wireless telecommunication devices when both approval to share the generated information about the geographical location of the first wireless telecommunication device and approval to display information about the geographical location of the at least one of the plurality of target wireless telecommunication devices are received; and
a group communication server, comprising:
means for storing an identity of the plurality of target wireless telecommunication devices designated by the first wireless telecommunication device;
means for controlling communication between the first wireless telecommunication device and the plurality of target wireless telecommunication devices;
means for transmitting the requested information about the geographical location of the at least one of the plurality of target wireless telecommunication devices to the first wireless telecommunication device; and
means for transmitting the generated information about the geographical location of the first wireless telecommunication device to the at least one of the plurality of target wireless telecommunication devices designated by the first wireless telecommunication device.

* * * * *